United States Patent
Golding

(10) Patent No.: US 10,896,339 B2
(45) Date of Patent: Jan. 19, 2021

(54) DETECTING MAGNETIC INK CHARACTER RECOGNITION CODES

(71) Applicant: Prosper Funding LLC, San Francisco, CA (US)

(72) Inventor: Paul Golding, San Francisco, CA (US)

(73) Assignee: Prosper Funding LLC, San Francisco, CA (US)

( * ) Notice: Subject to any disclaimer, the term of this patent is extended or adjusted under 35 U.S.C. 154(b) by 49 days.

(21) Appl. No.: 16/295,740

(22) Filed: Mar. 7, 2019

(65) Prior Publication Data

US 2020/0160080 A1 May 21, 2020

Related U.S. Application Data

(60) Provisional application No. 62/769,490, filed on Nov. 19, 2018.

(51) Int. Cl.
| | |
|---|---|
| *G06K 9/18* | (2006.01) |
| *G06K 9/00* | (2006.01) |
| *G06T 7/73* | (2017.01) |
| *G06T 5/30* | (2006.01) |
| *G06T 7/13* | (2017.01) |

(Continued)

(52) U.S. Cl.
CPC ......... *G06K 9/186* (2013.01); *G06K 9/00463* (2013.01); *G06K 9/00469* (2013.01); *G06K 9/2054* (2013.01); *G06K 9/6215* (2013.01); *G06K 9/6232* (2013.01); *G06K 9/6253* (2013.01); *G06K 9/6261* (2013.01); *G06T 3/60* (2013.01); *G06T 5/30* (2013.01); *G06T 7/11* (2017.01); *G06T 7/13* (2017.01);

(Continued)

(58) Field of Classification Search
CPC .... G06K 9/186; G06K 9/6215; G06K 9/6253; G06K 9/6261; G06K 9/00463; G06K 9/00469; G06K 9/6232; G06K 9/2054; G06K 2209/01; G06K 9/183; G06T 7/11; G06T 7/73; G06T 5/30; G06T 7/13; G06T 3/60; G06T 7/60; G06T 2207/30176

See application file for complete search history.

(56) References Cited

U.S. PATENT DOCUMENTS

| | | | |
|---|---|---|---|
| 10,733,661 B1 * | 8/2020 | Bergstrom | ......... G06K 9/00664 |
| 2009/0285482 A1 * | 11/2009 | Epshtein | ............ G06K 9/00463 |
| | | | 382/176 |
| 2017/0193320 A1 * | 7/2017 | Wilbert | ................... G06K 9/228 |

OTHER PUBLICATIONS

Jameson et al. "Extraction of Arbitrary Text in Natural Scene Image based on Stroke Width Transform." 14th International Conference on Intelligent Systems Design and Applications, Nov. 28, 2014, pp. 124-128 (Year: 2014).*

* cited by examiner

*Primary Examiner* — Jon Chang
(74) *Attorney, Agent, or Firm* — Ferguson Braswell Fraser Kubasta PC

(57) ABSTRACT

A method for image processing is disclosed. The method includes: obtaining an image including a check with a magnetic ink character recognition (MICR) code; generating a mask including a plurality of shapes based on the image and an estimated rotation angle of the check; generating a stroke width map (SWM) by applying a stroke width transform (SWT) to a plurality of regions in the image corresponding to the plurality of shapes; generating a first word line associated with a first region based on a plurality of words in the SWM; rotating a portion of the SWM associated with the first word line; and detecting, after rotating, the (Continued)

MICR code by applying a plurality of OCR processes to the portion of the SWM.

20 Claims, 15 Drawing Sheets

(51) Int. Cl.
    *G06T 3/60*     (2006.01)
    *G06K 9/62*     (2006.01)
    *G06K 9/20*     (2006.01)
    *G06T 7/60*     (2017.01)
    *G06T 7/11*     (2017.01)

(52) U.S. Cl.
    CPC ................. *G06T 7/60* (2013.01); *G06T 7/73* (2017.01); *G06K 2209/01* (2013.01); *G06T 2207/30176* (2013.01)

DETECTING MAGNETIC INK CHARACTER RECOGNITION CODES

CROSS-REFERENCE TO RELATED APPLICATIONS

This application claims priority under 35 U.S.C. § 119(e) to U.S. Provisional Patent Application No. 62/769,490, which filed on Nov. 19, 2018. U.S. Provisional Patent Application No. 62/769,490 is hereby incorporated by reference in its entirety.

BACKGROUND

A paper check includes a magnetic ink character recognition (MICR) code specifying, for example, a routing number and an account number. It is increasing popular for a user to deposit a paper check using a mobile device (e.g., smart phone, tablet computer, etc.). The process usually includes generating an image of the paper check using the mobile device's camera, and then extracting, from the image, the MICR code printed on the paper check. However, it can be difficult to identify and extract the MICR code from the image if the check is rotated (e.g., not horizontal) in the image, if the image is noisy, and/or if the image includes other objects in addition to the check. Regardless, using a mobile device to deposit a paper check remains popular.

SUMMARY

In general, in one aspect, the invention relates to a method for image processing. The method comprises: obtaining an image comprising a check with a magnetic ink character recognition (MICR) code; generating a mask comprising a plurality of shapes based on the image and an estimated rotation angle of the check; generating a stroke width map (SWM) by applying a stroke width transform (SWT) to a plurality of regions in the image corresponding to the plurality of shapes; generating a first word line associated with a first region based on a plurality of words in the SWM; rotating a portion of the SWM associated with the first word line; and detecting, after rotating, the MICR code by applying a plurality of OCR processes to the portion of the SWM.

In general, in one aspect, the invention relates to a system for image processing. The system comprises: a buffer that stores an image comprising a check with a magnetic ink character recognition (MICR) code; a mask engine that generates a mask comprising a plurality of shapes based on the image and an estimated rotation angle of the check; a stroke width transform (SWT) engine that: generates a stroke width map (SWM) by applying a SWT to a plurality of regions in the image corresponding to the plurality of shapes; generates a word line associated with a region based on a plurality of words in the SWM; and rotates a portion of the SWM associated with the word line; and a voting engine that detects the MICR code by applying a plurality of OCR processes to the portion of the SWM after the portion is rotated.

In general, in one aspect, the invention relates to a non-transitory computer readable medium (CRM) storing instructions for image processing. The instructions, when executed by a computer processor, comprise functionality for: obtaining an image comprising a check with a magnetic ink character recognition (MICR) code; generating a mask comprising a plurality of shapes based on the image and an estimated rotation angle of the check; generating a stroke width map (SWM) by applying a SWT to a plurality of regions in the image corresponding to the plurality of shapes; generating a word line associated with a region based on a plurality of words in the SWM; and rotating a portion of the SWM associated with the word line; and detecting the MICR code by applying a plurality of OCR processes to the portion of the SWM after the portion is rotated.

Other aspects of the embodiments will be apparent from the following description and the appended claims.

DETAILED DESCRIPTION

Figure 1:
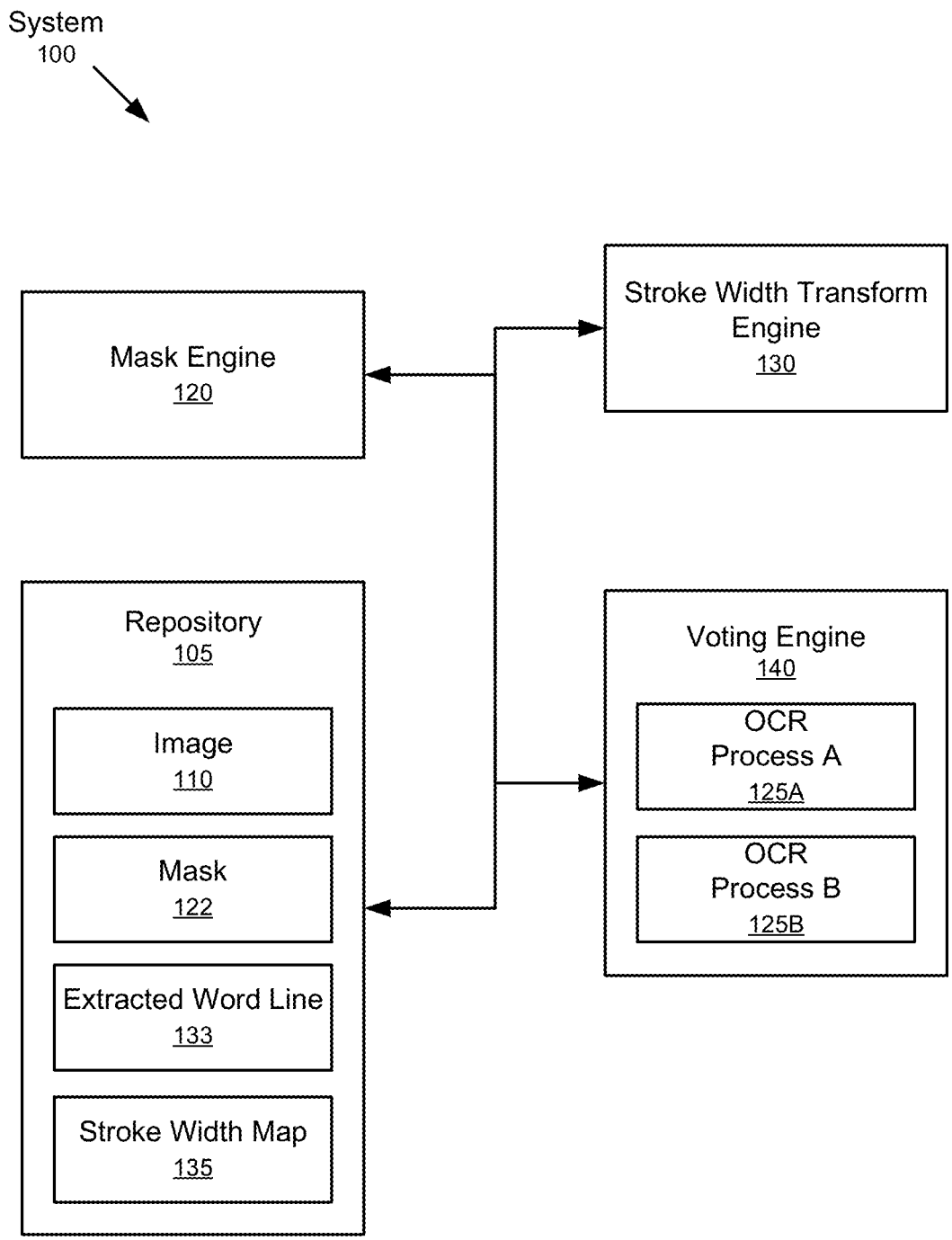
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the invention provide a system, a method, and a non-transitory computer readable medium for performing image processing. Specifically, the image processing is applied to an image including a check in an attempt to determine the MICR code printed on the check. It is likely that that the check is rotated (e.g., not horizontal) in the image. Accordingly, at least one portion of the image processing includes rotating the image (or at least a detected line of characters suspected to be the MICR code) to make the line horizontal. Then, multiple OCR processes are applied to each character in the line. In one or more embodiments, the MICR code has been successfully identified when there is a high level of agreement between the multiple OCR processes as to the characters in the line.

FIG. 1 shows a system (100) in accordance with one or more embodiments. The system (100) has multiple components including a repository (105), a mask engine (120), a stroke width transform (SWT) engine (130), and a voting engine (140). Each of these components (105, 120, 130, 140) may execute on the same computing device (e.g., server, personal computer (PC), laptop, smart phone, tablet PC, etc.) or may execute on different computing devices connected by a network (e.g., the Internet) having wired and/or wireless segments. Moreover, each component (105, 120, 130, 140) may be implemented in hardware (i.e., circuitry), in software, or in any combination of hardware and software.

In one or more embodiments, the repository (105) corresponds to any type of database, any type of memory (e.g., main memory, cache memory, etc.), and/or any type of permanent storage device (e.g., hard drive). Moreover, the repository (105) may correspond to multiple storage devices located at the same location or at different locations.

In one or more embodiments, the repository stores an image (110). The image (110) may have been acquired by a camera of a mobile device (e.g., smart phone, tablet PC, etc.). The image (110) may have been obtained over a computer network. In one or more embodiments, the image (110) includes a check with a MICR code. The characters in the MICR code include numerical symbols (i.e., 0-9) and special symbols. The characters in the MICR code have unique geometric and statistical properties that were designed for magnetic-resonance readers. The check (and thus the MICR code printed on the check) is likely to be rotated (e.g., not horizontal) in the image (110). The image (110) may include noise and other features in addition to the check.

In one or more embodiments, the mask engine (120) is configured to generate a mask (122). The mask (122) may be the same size as the image. The mask (122) includes one or more transparent shapes (e.g., rectangles), and each shape corresponds to a region of the image where the MICR code is likely to be located. The remainder of the mask (122) is opaque (e.g., all black). Accordingly, if the mask (122) is applied to the image (110), the entire image (110) is covered except for the regions of the image (110) located below the transparent shapes of the mask (122). Additional details regarding the operations of the mask engine (120), including generation of the mask (122), are discussed below in reference to FIGS. 2-4.

In one or more embodiments, the SWT engine (130) is configured to apply the SWT to the image (110) and output one or more word lines (e.g., extracted word line (133)) based on the SWT. The SWT engine (130) may perform edge detection on the image (110) before applying the SWT. The SWT may also apply the mask (122) to the image (110) before applying the SWT to the image (110). As a result of applying the mask (122), the SWT is only applied to the regions of the image (110) corresponding to the shapes in the mask (122). This reduces the required computational resources (e.g., memory, processor time/power, etc.) since the SWT is not being applied to the whole of image (110).

In one or more embodiments, the result of the SWT is a stroke width map (SWM) (135). In the SWM (135), each pixel is an indicator as to its likelihood of being contained inside a character. SWT engine (130) may also identify/form characters from the SWM (135) and then execute word formation and word line formation based on the identified characters. The extracted word line (133) may correspond to a cropped portion of the SWM including a word line that has been rotated to be horizontal. Additional details regarding the operations of the SWT engine (130) are discussed below in reference to FIGS. 2 and 5.

In one or more embodiments, the voting engine (140) is configured to execute multiple OCR processes (e.g., OCR process A (125A), OCR process B (125B)). OCR process A (125A) may correspond to a traditional OCR process. In one or more embodiments, the traditional OCR process is trained to recognized MICR characters. In contrast, OCR Process B (125B) may utilize a structural similarity index (SSI). Both OCR processes (125A, 125B) operate on individually cropped and de-skewed characters from the extracted word line (133). When the output of both OCR processes (125A, 125B) match for a threshold number of characters in the extracted word line (133), the extracted word line (133) is determined to be the MICR code. If there are multiple extracted word lines, the extracted word line with the highest number of matches (i.e., the highest number of votes) is determined to be a candidate for the MICR code.

Although the system (100) in FIG. 1 is shown as having four components (105, 120, 130, 140), in other embodiments, the system (100) may have additional components and/or some of the shown components (105, 120, 130, 140) may be merged into a single component.

Figure 2:
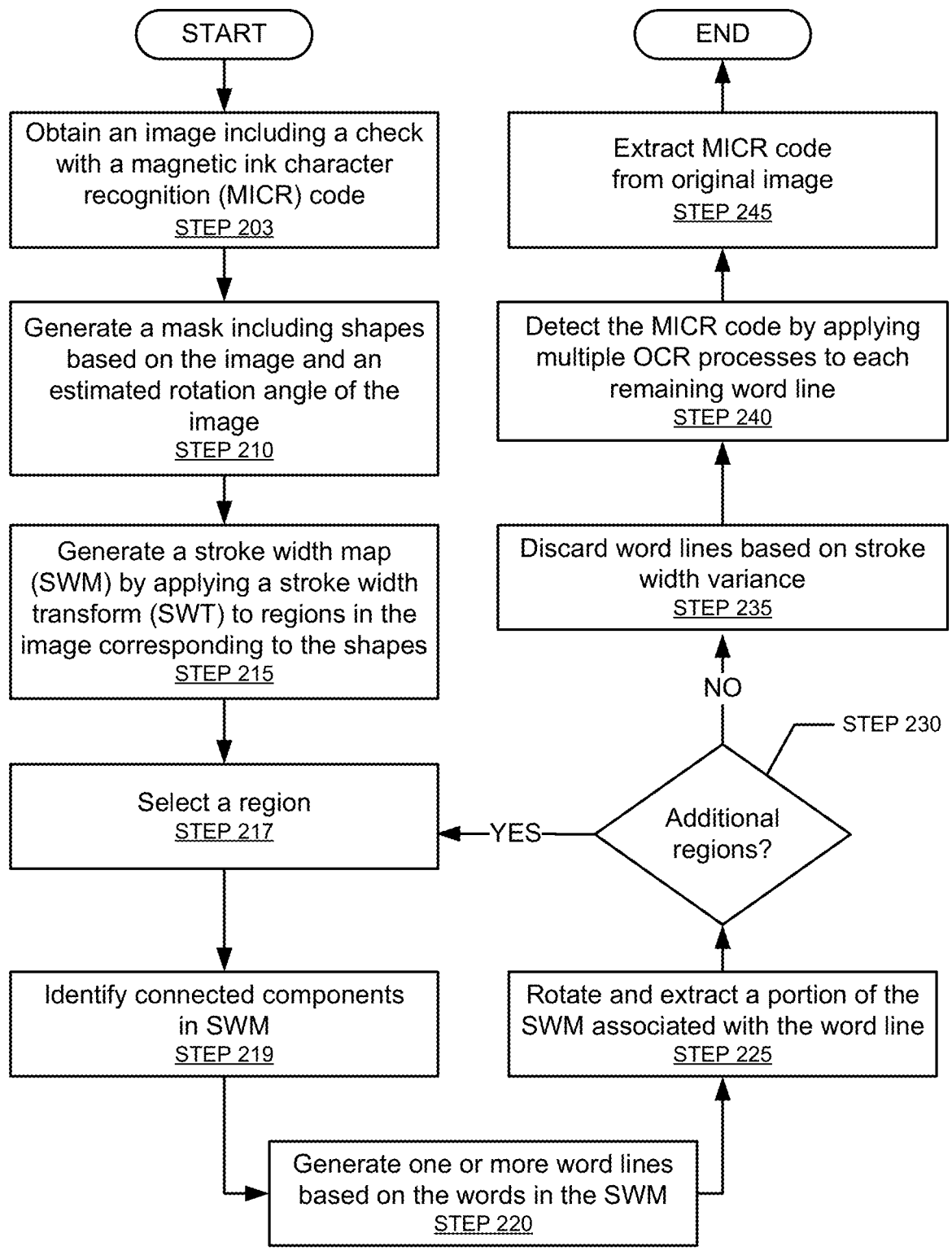
FIGS. 2-6 show flowcharts in accordance with one or more embodiments of the invention.

FIG. 2 depicts a flowchart in accordance with one or more embodiments. One or more steps of the flowchart may be performed by one or more components of system (100), discussed above in reference to FIG. 1. In one or more embodiments, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

In Step 203, an image is obtained. The image includes a check with an MICR code. It is likely that the check (and thus the MICR code) is rotated by a non-zero rotation angle within the image (i.e., the check is not horizontal in the image). The image may also include noise and other components in additional to check.

In Step 210, a mask is generated based on the image and an estimated rotation angle of the image. The mask may be the same size as the image. The mask includes one or more transparent shapes (e.g., rectangles), and each shape corresponds to a region of the image where the MICR code is likely to be located. Additional details regarding Step 210 are discussed below in reference to FIG. 3.

In Step 215, a stoke width map (SWM) is generated. The SWM map be generated by performing edge detection (e.g., Canny edge detection) on the image, applying the mask to the image, and then applying a stroke width transform (SWT) to the regions of the image corresponding to the shapes of the mask (i.e., the regions of the image exposed after applying the mask). In the SWM, each pixel is an indicator as to its likelihood of being contained inside a character.

In Step 217, one of the regions is selected. If this is the first execution of Step 217, all regions are available for selection. If this is not the first execution of Step 217, only regions that have not yet been selected are available for selection. A region may be selected at random. Additionally or alternatively, the largest region may be selected.

In Step 219, one or more connected components may be identified within the section of the SWM corresponding to the selected region. A connected component is a contiguous shape that might or might not be part of a character. Moreover, the stroke width standard deviation and/or other statistical characteristics for each connected component may be determined.

In one or more embodiments, if the number of identified connected components exceeds a connected component threshold, this might be indicative of a highly noise image. In such embodiments, the section of the SWM corresponding to the selected region is discarded (i.e., ignored) and the process proceeds to Step 230 (skipping steps 219, 220, and

225). This reduces unnecessary processing of the image and thus reduces utilization of computational resources. Heuristics or machine learning may be used to determine the connected component threshold.

In one or more embodiments, if a connected component has a stroke width standard deviation of zero (or some low value below a threshold), the connected component is likely a skinny straight line caused by between-character artifacts in the SWT process or noise and may be discarded. This also reduces unnecessary processing of the image and thus reduces computational resources.

In one or more embodiments, co-located connected components are grouped to form characters. One or more of the centroids for each formed character, the stroke width mean for each formed character, the stroke width median for each formed character, the stroke width standard deviation for each formed character, and/or other statistical properties may be determined.

In Step 220, one or more word lines are identified within the section of the SWM corresponding to the selected region. Identifying word lines may include grouping characters into words, determining angular estimates for the words, and then grouping co-linear words. Additional details regarding Step 220 are discussed below in reference to FIG. 5.

In Step 225, the entire SWM or at least a portion of the SWM including a word line is rotated based on a function of the angular estimates for the words of the word line. Following the rotation, the word line in the SWM is now horizontal or approximately horizontal. The portion of the SWM may be extracted (e.g., cropped) from the SWM before or after the rotation. Additional details regarding Step 225 are discussed below in reference to FIG. 5.

In Step 230, it is determined whether at least one region has not yet been selected. When it is determined that at least one region has not yet been selected, the process returns to Step 217. When all regions have been selected, the process may proceed to Step 235. Those skilled in the art, having the benefit of this detailed description, will appreciate that steps 219, 220, and 225 may be executed for each region.

In Step 235, the extracted word lines are pruned. In other words, one or more extracted word lines may be discarded. MICR characters exhibit a predictable and typically higher degree of stroke width variance than other non-MICR characters on the check due to their unique magnetic-signature design. Accordingly, if each character in an extracted word line has a high degree of stroke width variance (i.e., the stroke width variance of each character exceeds a variance threshold), this is indicative that the extracted word line corresponds to the MICR code. In contrast, if each character in an extracted words line does not have a high degree of stroke width variance (i.e., the stroke width variance of each character is less than a variance threshold), this is indicative that the extracted word line does not correspond to the MICR code and can be discarded.

In Step 240, the MICR code is detected by applying multiple OCR processes to each extracted word line. Specifically, each extracted word line may be cropped into individual characters and each of these characters de-skewed. Then, each character is submitted to both a traditional OCR process, which might or might not be trained to recognize MICR characters, and an OCR process that utilizes a structural similarity index (SSI). The OCR process compares the submitted character to pristine pre-stored images for each of the MICR numerical symbols (i.e., 0-9). The matching digit found via SSI is compared with the output of the traditional OCR process. When the output of both OCR processes match for a threshold number of characters (e.g., 85%) in the extracted word line, the extracted word line is determined to correspond to the MICR code. In one or more embodiments, if there are multiple extracted word lines, the extracted word line with the highest number of matches (i.e., the highest number of votes) is determined to correspond to the MICR code. The threshold for similar characters could be determined using machine learning or via a heuristic based upon a number of observations.

In Step 245, the candidate MICR code is extracted from the original image. In one or more embodiments, Step 245 is necessary because the word line(s) from Step 240 that likely correspond to the MICR code might not have every numerical symbol of the MICR code (i.e., one or more numerical symbols of the MICR may have been inadvertently discarded during the various pruning processes described herein). Additional details regarding Step 245 are discussed below in reference to FIG. 6.

Figure 3:
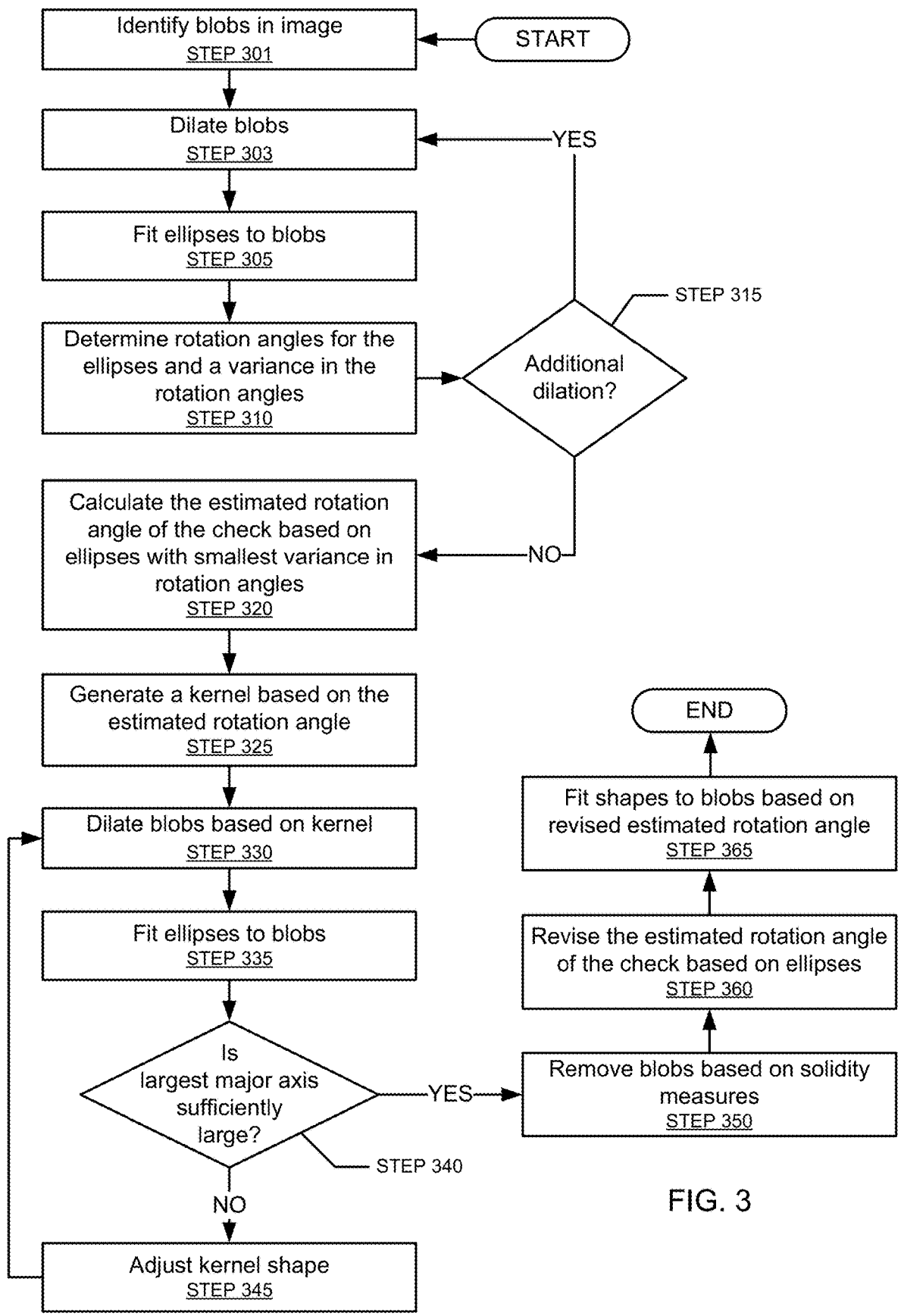

FIG. 3 depicts a flowchart in accordance with one or more embodiments. One or more steps of the flowchart may be performed by one or more components of system (100), discussed above in reference to FIG. 1. One or more of the steps in FIG. 3 may be correspond to Step 210, discussed above in reference to FIG. 2. In one or more embodiments, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

In Step 301, one or more blobs are identified within the image. The blobs correspond to textual areas within the image and are formed via a method such as maximally stable extremal region estimation or a method that might discriminate stable image features such as characters. Additional details regarding Step 301 are discussed below in reference to FIG. 4.

In Step 303, the blobs are dilated. As the direction of the text (e.g., MICR code characters) is not yet known, the blobs may be dilated equally in both the x and y directions. As the blobs are dilated, they begin to coalesce and resemble words or lines of text. The extent of the dilation might be determined by heuristics of machine learning that takes into account various image parameters such as resolution.

In Step 305, ellipses are fit to the blobs. In one or more embodiments, ellipses are only fit to the largest N blobs (e.g., N=4). N can be determined heuristically or via machine learning that takes into account various image parameters such as resolution. It is likely that each fitted ellipse will be rotated (e.g., the x-axis and the major axis of the ellipse form a non-zero angle) and that ellipses fitted to different blobs will be rotated by different amounts. In Step 310, the rotation angles for the fitted ellipses are determined. Further, the variance in the rotation angles is also determined.

In Step 315, it is determined whether the blobs should be dilated further (i.e., dilated by a different amount). When it is determined the blobs should be dilated further, the process returns to Step 303, where the blobs are dilated by a different amount. When it is determined that the blobs should not be dilated further or have been dilated sufficiently, the process proceeds to Step 320. For example, during each iteration, the longest estimated major axis is computed and compared to a threshold. When the longest estimated major axis exceeds the threshold, this is likely an indication that the blobs have been dilated sufficiently and the process can proceed to Step 320. The threshold can be determined heuristically or via machine learning that takes into account various image parameters such as resolution.

Upon reaching Step 320, Steps 303, 305, and 310 have likely been executed multiple times. Accordingly, multiple variances in ellipse rotation angles have been determined. In Step 320, the ellipse rotation angles that resulted in the smallest variance are used to calculate the estimated rotation angle for the check within the image. In one or more embodiments, the estimated rotation angle for the check is the mean ellipse rotation angle or median ellipse rotation angle among the ellipse rotation angles that resulted in the smallest variance. Although the embodiments in FIG. 3 focus heavily on the use variance, any estimate of aggregate accuracy may be used.

In Step 325, a kernel is generated. For example, the kernel may be a 2×8 matrix of is. Moreover, the kernel may be rotated by the estimated rotation angle calculated in Step 320. In Step 330, the initially identified blobs (i.e., Step 301) are dilated using the kernel from Step 325. This kernel will dilate the blobs in the direction of the estimated rotation angle. This results in the blobs becoming better formed in the direction of the estimate rotation angle.

In Step 335, ellipses are fitted to the blobs. Step 335 is essentially the same as Step 305. Let set X be the fitted ellipses of Step 335. Let set Y be the fitted ellipses from Step 305 that had the smallest variance in rotation angles. In Step 340, it is determined whether the largest major axis in set X equals or exceeds the largest major axis in set Y. When it is determined that the largest major axis in set X is less than the largest major axis in set Y, this is indicative that the dilation in Step 330 did not result in well-formed MICR candidate regions. Accordingly, the process proceeds to Step 345, where the kernel shape is adjusted (e.g., stretched in one direction, etc.) before returning to Step 330. When it is determined that the largest major axis in set X equals or exceeds the largest major axis in set Y, the process proceeds to Step 350.

In Step 350, the dilated blobs are pruned. In other words, one or more dilated blobs may be removed/discarded. Identifying blobs to discard may include calculating the area of each blob, calculating the convex hull for each blob, and calculating the area of each convex hull. A solidity measure based on the ratio of the blob's area to the blob's convex hull area is determined for each blob. This solidity measure is compared with a solidity threshold. If the solidity measure fails to satisfy the solidity threshold, the blob may be discarded. The solidity threshold may be determined using heuristics or machine learning. Those skilled in the art, having the benefit of this detailed description, will appreciate that there are other ways to calculate a solidity measure for each blob.

Those skilled in the art, having the benefit of this detailed description, will also appreciate that the solidity measure is effectively a measure of rectangularity. Because of the geometric properties of the MICR strip, which includes the numerical symbols and the special symbols, the blob actually corresponding to the MICR strip is likely to be highly rectangular and thus satisfy the solidity threshold. In contrast, blobs that are not highly rectangular are unlikely to correspond to the MICR strip and can be discarded without additional consideration. This reduces utilization of computational resources.

Additionally or alternatively, rectangles may be fitted to each dilated blob. The shortest dimension of the rectangle (representing the height of the blob or the length of the blob) may be compared with the expected height of the MICR code for a range of check images. If there is no match (within a tolerance) between the shortest dimension and any expected MICR code heights, the blob may be discarded without additional consideration. This reduces utilization of computational resources.

In Step 360, the estimated rotation angle is revised. Upon reaching Step 360, some of the blobs may have been discarded. The rotation angles of the ellipses fitted to the remaining blobs are used to revise the estimated rotation angle. For example, the estimated rotation angle may be revised to equal the mean or median rotation angle of ellipses fitted to the remaining blobs.

In Step 365, shapes (e.g., rectangles) having the same rotation angle as the revised estimated rotation angle are fitted to the blobs. The shapes are used to form part of the mask. Specifically, when the mask is applied to the original image, only the regions of the original image below these shapes will be exposed for additional processing.

As discussed above, one or more of the steps in FIG. 3 may correspond to Step 210 of FIG. 2. Accordingly, one or more of the steps in FIG. 3 may be performed before some of the steps in FIG. 2. Further, although the embodiments in FIG. 3 focus heavily on fitting ellipses, any shape determined by blob morphology may be used.

Figure 4:
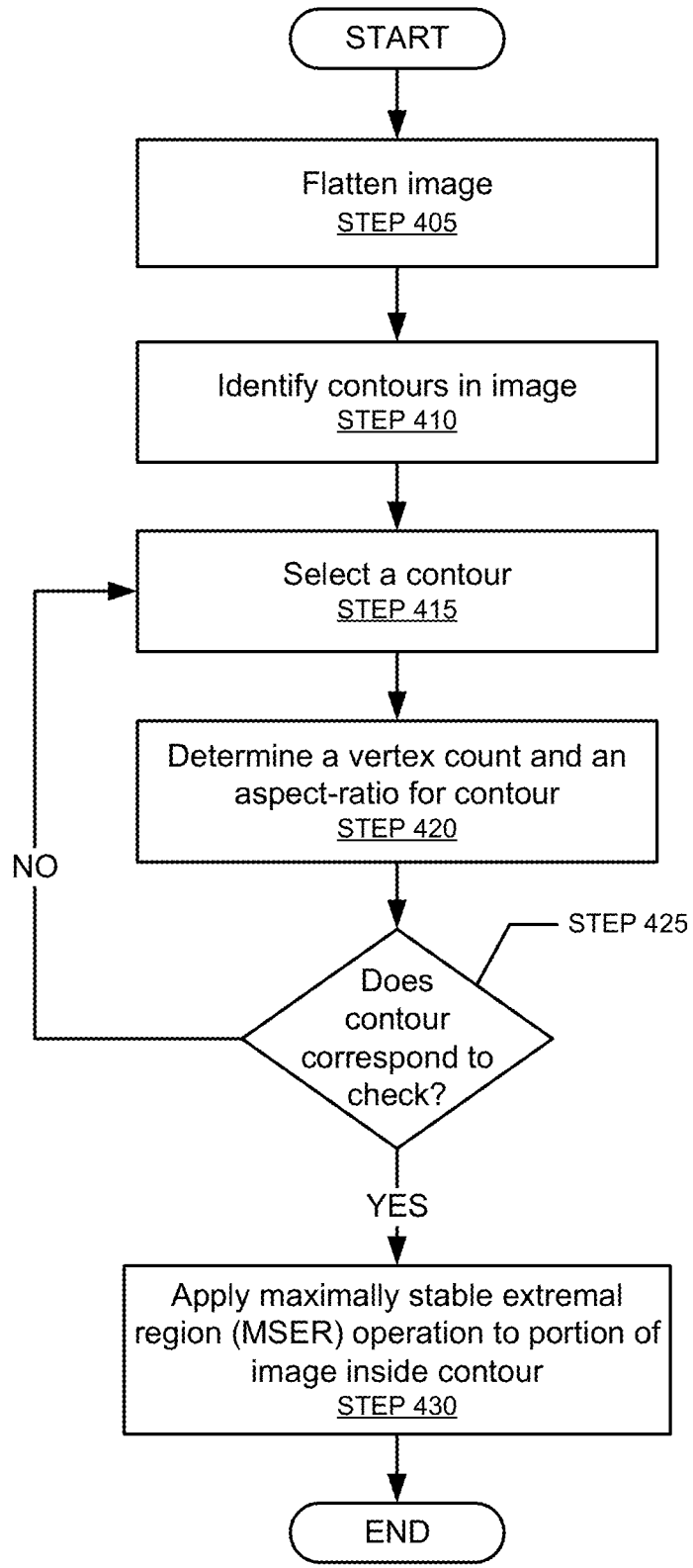

FIG. 4 depicts a flowchart in accordance with one or more embodiments. One or more steps of the flowchart may be performed by one or more components of system (100), discussed above in reference to FIG. 1. One or more of the steps in FIG. 4 may be correspond to Step 301, discussed above in reference to FIG. 3. In one or more embodiments, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

In Step 405, the image is flattened. The image may be flattened by applying adaptive thresholding to the image. Flattening the image tends to enhance the contrast between stable regions, like black text, and less stable regions, like noisy pixels. Low contrast regions tend to get eliminated via flattening.

In Step 410, contours are identified in the image. The contours may be identified by applying contour masking to the image.

In Step 415, one of the contours is selected. If this is the first execution of Step 415, all contours are available for selection. If this is not the first execution of Step 415, only contours that have not yet been selected are available for selection. The largest contour may be selected. Additionally or alternatively, a contour may be selected at random.

In Step 420, the number of vertices in the selected contour are counted (i.e., vertex count) and an aspect-ratio for the contour is determined. The aspect-ratio may be compared with a range of permissible check aspect ratios.

In Step 425, it is determined whether the selected contour corresponds to the check. In one or more embodiments, the contour corresponds to the check if is rectangular in shape (e.g., vertex count is at least four vertices) and the aspect-ratio matches, within a tolerance, one of the permissible check aspect ratios. When it is determined that the contour corresponds to the check, the process proceeds to Step 430. When it is determined that the contour does not correspond to the check, the process returns to Step 415.

In Step 430, a maximally stable extremal region (MSER) operation is performed on the portion of the image within the selected contour. The output of the MSER operation is blobs indicating stable regions.

As discussed above, one or more of the steps in FIG. 4 may correspond to Step 301 of FIG. 3. Accordingly, one or more of the steps in FIG. 4 may be performed before some of the steps in FIG. 3.

Figure 5:
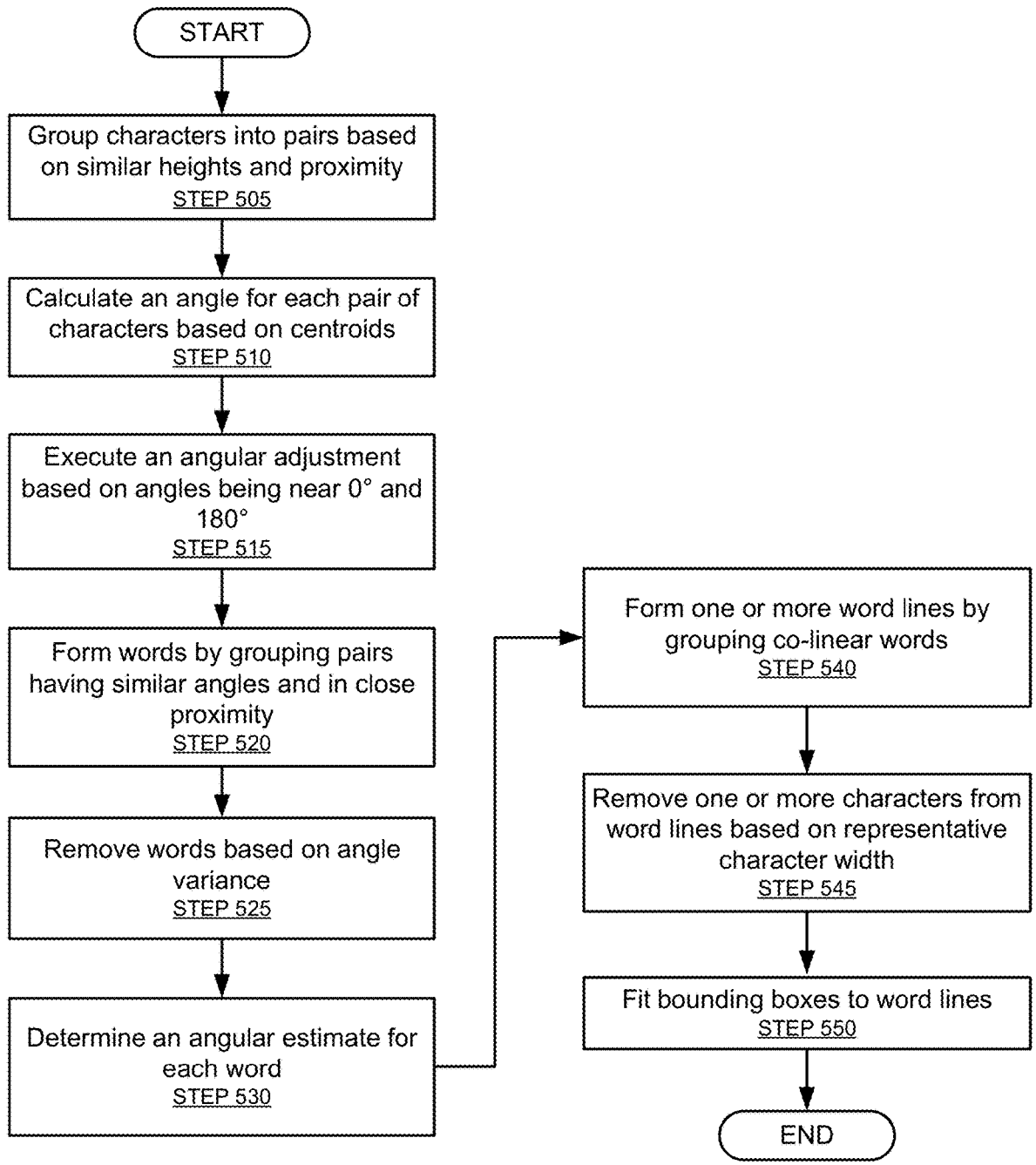

FIG. 5 depicts a flowchart in accordance with one or more embodiments. One or more steps of the flowchart may be performed by one or more components of system (100), discussed above in reference to FIG. 1. One or more of the steps in FIG. 5 may be correspond to Steps 220 or 225, discussed above in reference to FIG. 2. In one or more embodiments, one or more of the steps shown in FIG. 5 may be omitted, repeated, and/or performed in a different order than the order shown in FIG. 5. Accordingly, the scope of the invention should not be considered limited to the specific arrangement of steps shown in FIG. 5.

Upon reaching Step 505, one or more characters have been identified within a section of the SWM corresponding to a region of the image. In Step 505, characters are grouped into pairs based on heights and proximity. In other words, characters with similar heights (e.g., heights that differ by less than a threshold) that are in close proximity may be grouped as a pair. A single character may belong to more than one group.

In Step 510, an angle is calculated for each pair. As discussed above, each character has a centroid. The angle may be measured between the horizontal and a line that passes through both centroids of the characters in the pair.

When the check is close to being vertical in the image, it is possible for some of the angles calculated in Step 510 to be slightly larger than 0°, while other angles calculated in Step 510 to be slightly smaller than 180°, even though all text printed on the check is in the same direction. This discrepancy may be the result of imperfections in the SWT and/or in determining centroids for characters. In Step 515, an angular adjustment may be executed. Execution of Step 515 is conditioned on this scenario being true. In such scenarios, the angles slightly smaller than 180° (i.e., within a threshold) are adjusted or reflected to be (180° minus the calculated angle). For example, if the calculated angles from step 510 are: 1.2°, 2.2°, 177.2°, 178°, 1.1°, following execution of Step 515, the angles are now: 1.2°, 2.2°, 2.8°, 2°, and 1.1°.

In Step 520, one or more words are formed by grouping character pairs that are co-linear. In one or more embodiments, two character pairs are co-linear if they have angles (as calculated in Step 510 and possibly adjusted in Step 515) that: (a) differ by less than an angle threshold; and (b) are in close proximity to each other.

In Step 525, one or more words may be removed based on an angle variance. As discussed above, words are composed of multiple character pairs, and each character pair is associated with a calculated angle. Let $P_1, \ldots, P_M$ be the M characters pairs that form a word. Let $\Theta_1, \ldots, \Theta_M$ be M angles for the M character pairs. If the word corresponds to the MICR code, the angle variance (i.e., the variance of $\Theta_1, \ldots, \Theta_M$) will be small. Accordingly, any word with an angle variance in excess of a threshold is unlikely to correspond to the MICR code and may be discarded without additional processing. This reduces the utilization of computational resources.

In STEP 530, an angular estimate is calculated for each remaining word. The angular estimate for a word may be the mean or median of the angles corresponding to the character pairs in the word. Additionally or alternatively, regression may be used to fit a line to the centroids in the word and the angular estimate is the angle between the horizontal (or vertical) and the fitted line.

In STEP 540, one or more word line are formed by grouping co-linear words regardless of spacing between the words. Any overlap between words due to common character memberships may be removed.

In STEP 545, one or more characters in a word line are removed based on a representative character width for the line. For example, the representative character width may be the mean or median character width of all characters in the word line. If the width of any character in the word line is less than the representative character width by at least a width tolerance, the character may be removed from the word line. This pruning step is likely to remove the MICR code special symbols from the word line, but keep the MICR code numerical symbols (i.e., 0-9).

In STEP 550, a bounding box is fitted to each word line. As discussed above, an angular estimate was previously calculated for each word in the word line (Step 530). The rotation angle of the bounding box for a word line may be set to the mean or median of the angular estimates for the words in the word line. Additionally or alternatively, the rotation angle of the bounding box may be set to the revised estimated rotation angle of Step 360, discussed above in reference to FIG. 3. The rotation angle of the bounding box is used to rotate the SWM and make the word line (and the bounding box) horizontal (see, e.g., Step 225 of FIG. 2). For example, if the rotation angle of the bounding box is determined to be +15°, the SWM and the bounding box may be rotated −15°, which would result in the word line in the SWM being horizontal or approximately horizontal. Moreover, each bounding box defines the portion of the SWM to be extracted (e.g., cropped) for submission to the OCR processes.

Those skilled in the art, having the benefit of this detailed description, will appreciate that the process depicted in FIG. 5 may be repeated for each region of the image.

Figure 6:
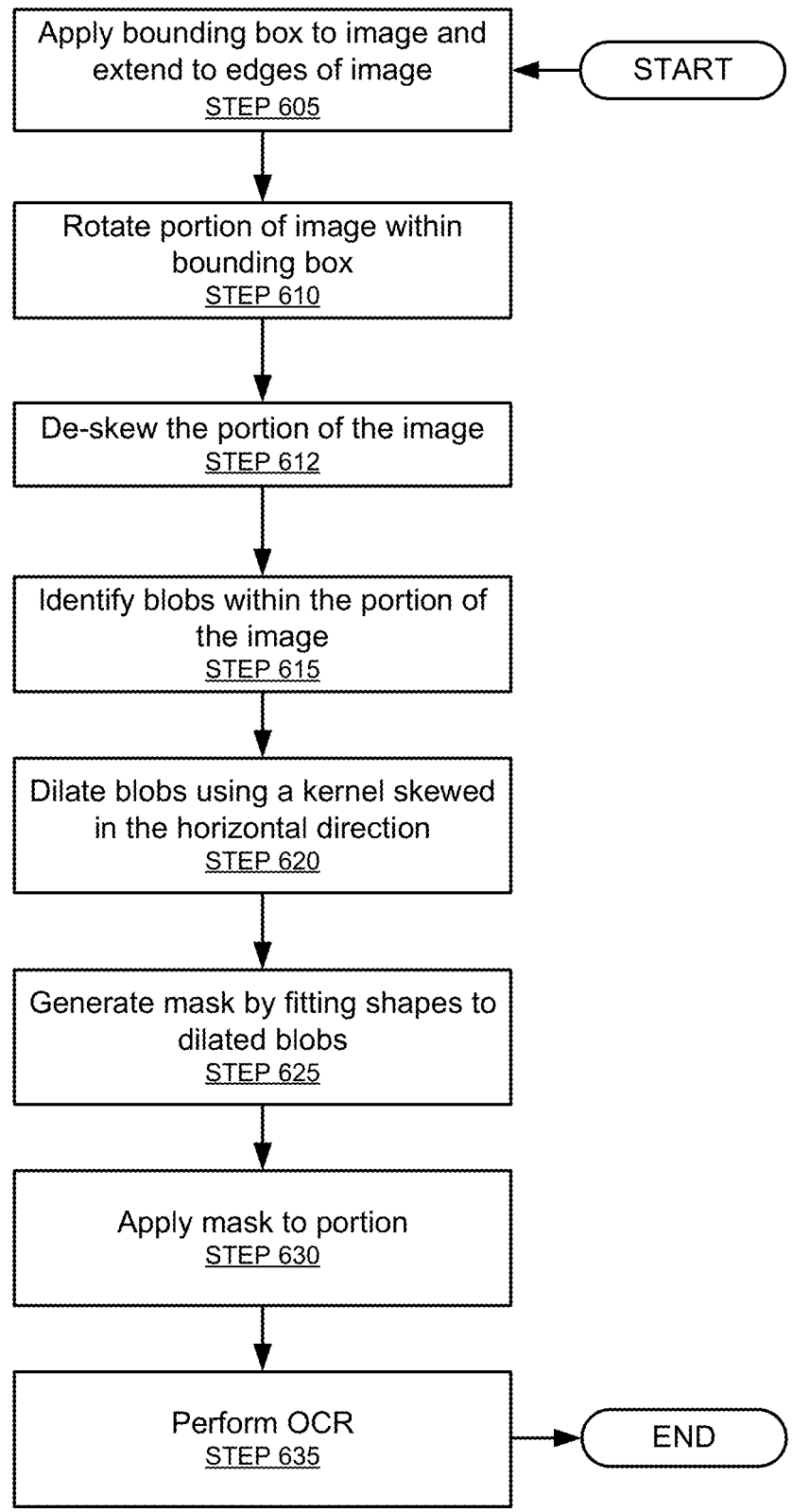

FIG. 6 depicts a flowchart in accordance with one or more embodiments. One or more steps of the flowchart may be performed by one or more components of system (100), discussed above in reference to FIG. 1. One or more of the steps in FIG. 6 may be correspond to Steps 245, discussed above in reference to FIG. 2. In one or more embodiments, one or more of the steps shown in FIG. 6 may be omitted, repeated, and/or performed in a different order than the order shown in FIG. 6. Accordingly, the scope of the invention should not be considered limited to the specific arrangement of steps shown in FIG. 6.

Upon reaching Step 605, one or more word lines are likely candidates for the MICR code (see, e.g., Step 240). In Step 605, for each word line, the bounding box used to extract the word line is applied to the original image (not the SWM) and extended to the edges of the image (or check within the image if the check boundary was successfully computed in Step 425). This extension may be necessary to ensure all characters of the MICR code are extracted if they were not entirely extracted via the SWM. For example, the original bounding box (i.e., bounding box prior to extension) may exclude one or more MICR code characters. The word line itself also cannot be used because one or more MICR code numerical symbols may have discarded through the various pruning processes. By using the extended bounding box, it is highly likely that the entire MICR code is located within the extended bounding box.

In Step 610, the entire image or at least a portion of the image within the bounding box is rotated based on rotation angle of the bounding box. Accordingly, the MICR code within the image is now horizontal or approximately horizontal. The portion of the image may be extracted (e.g., cropped) from the image before or after the rotation.

In Step 612, the extracted portion of the image is de-skewed to straighten the content within the portion. The de-skewing process may involve calculating moments. Those skilled in the art, having the benefit of this detailed description, will appreciate that de-skewing can be a computationally expensive process. However, as the de-skewing in Step 612 operates only on the extracted portion of the image (and not the entire image), this reduces the required computational resources.

In Step 615, one or more blobs are identified in the extracted portion of the image. The blobs may be identified by flattening the extracted portion (if the image has not already been flattened), and performing a maximally stable extremal region (MSER) operation the extracted portion of the image. The output of the MSER operation is blobs indicating stable regions.

In Step 620, the blobs are dilated using a kernel skewed in the horizontal direction. In Step 625, shapes (e.g., rectangles) are fit to the one or more blobs. The size and location of these shapes are used to generate a mask.

In Step 630, the mask is applied to the extracted portion. Following application of the mask, it is highly likely that the exposed section(s) corresponds to the MICR code. In Step 635, OCR is performed on this remaining exposed section(s) of the image, which is then fed to a MICR-parser that is trained to find the required parts of the MICR code (e.g., account number, routing number, check number) using a variety of pattern matching techniques.

Those skilled in the art, having the benefit of the benefit of this detailed description, will appreciate that with the mask applied to only include stable regions, it is likely that the OCR is operating only on character data (e.g., numerical symbols). The OCR in Step 630 may be the same as or different than the OCR processes discussed above in reference to Step 240, discussed above in reference to FIG. 2.

Those skilled in the art, having the benefit of this detailed description, will also appreciate that once the MICR parser is executed, it is possible that some of the numerical symbols in the MICR code will not recovered. For example, no data may be returned by the MICR parser or just one element (e.g., routing number) may be returned by the MICR parser. Having reached the process of FIG. 6, it is highly likely that the cropped segment most likely contains the MICR code and so any failure to extract the MICR code might be due to some kind of image degradation.

In one or more embodiments, due to the relatively small size of the extracted portion compared with the entire image, it is not computationally expensive to apply a variety of image enhancement techniques iteratively to the extracted portion and then running the MICR parser on each iteration. In other words, for each image enhancement technique, Steps 615-635 may be repeated. For each iteration, the portion of the MICR string believed to have been successfully extracted is recorded. A vote amongst all the potential candidates can be executed to assemble a final and complete MICR string.

In one or more embodiments, this iterative image enhancement and MICR string comparison allows for selectively treating parts of the entire check image using different, and locally applied, image enhancement techniques. This is advantageous because it is often the case that degradation of an image is regionally selective (e.g., blurring on one side only). It is also the case that many image enhancement or degradation-mitigation strategies can interfere with the OCR of regions without degradation. In other words, enhancement of a degraded region mitigates the degradation, while enhancement of a non-degraded region might introduce new degradation. This is particularly the case when using the SWT method because it relies heavily on certain pre-processing steps like Canny edge detection and differentiation (slope detection) that are highly susceptible to certain types of image degradation.

Figure 7:
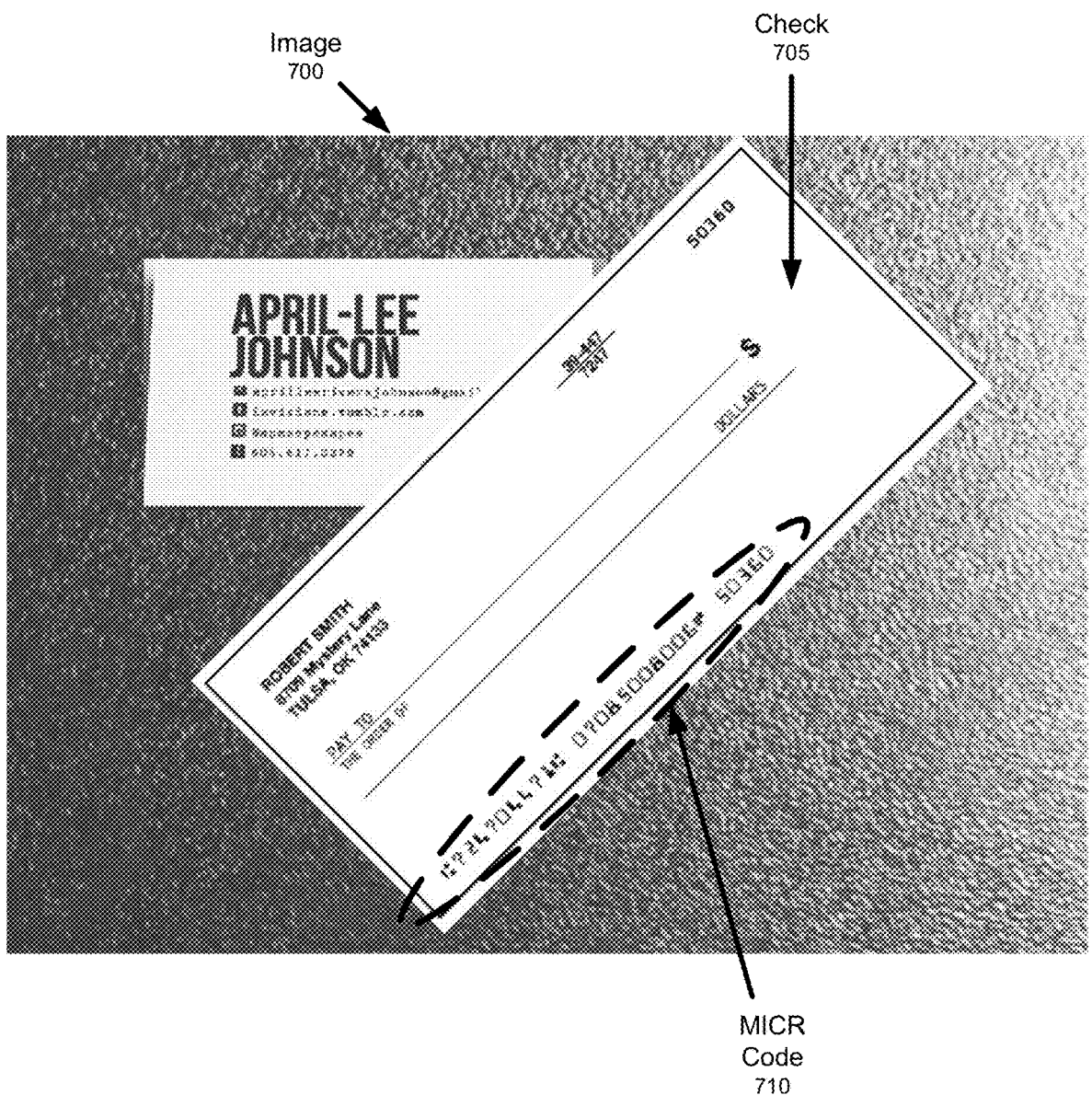
FIGS. 7-14 show examples in accordance with one or more embodiments of the invention.

FIGS. 7-14 show examples in accordance with one or more embodiments of the invention. FIG. 7 shows an image (700) captured using the camera of a smart phone. As shown in FIG. 7, the image includes a check (705) and there is a MICR code (710) printed on the check (705). The MICR code (710) is not horizontal. Accordingly, attempting to extract the MICR code (710) by performing OCR on the image (700) is likely to be unsuccessful. The image (700) also includes a noisy background and a business card in addition to the check (708).

Figure 8:
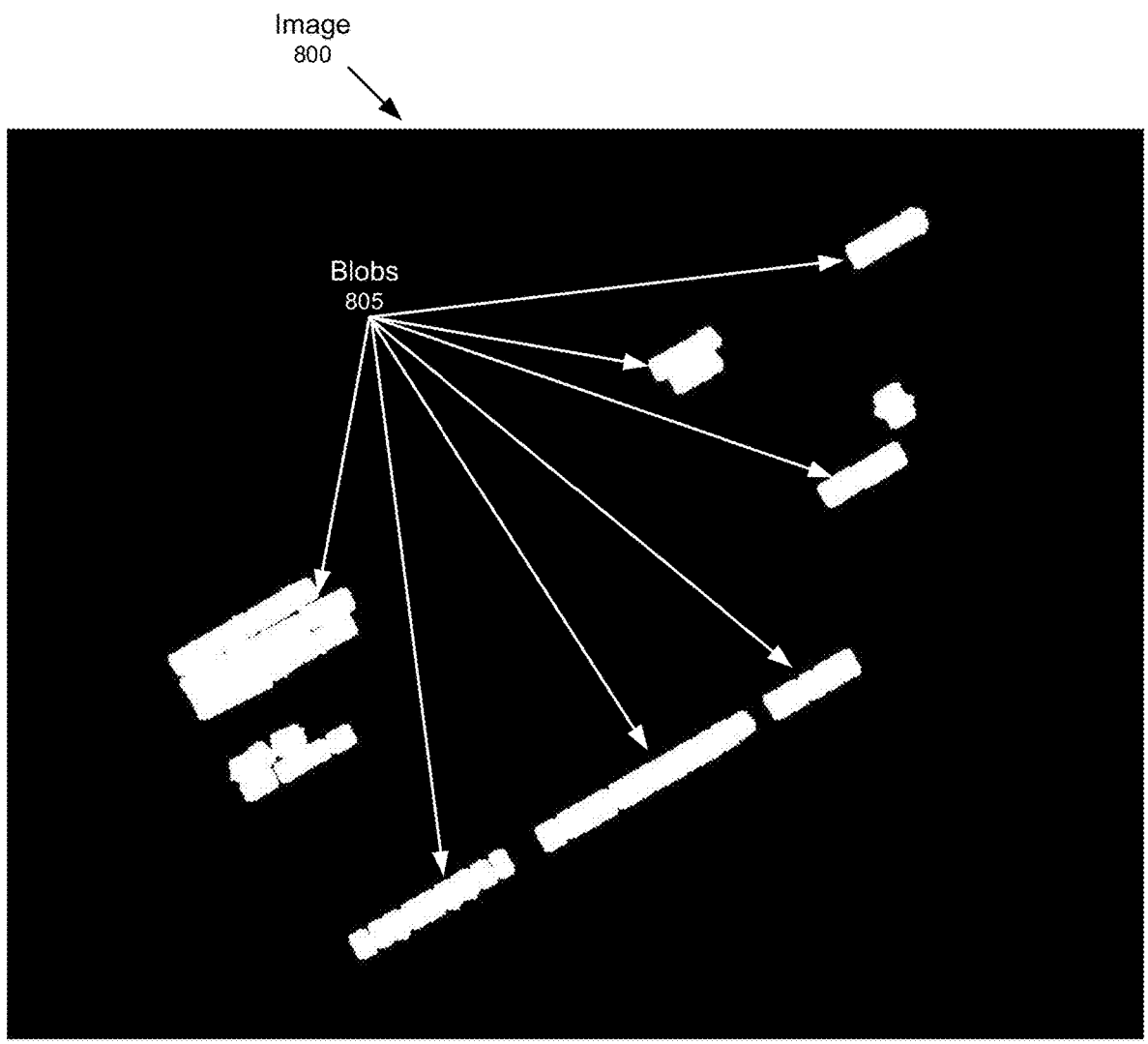

FIG. 8 shows the image (800) following identification of the blobs (805). As discussed above, the blobs indicate stable regions within the check. One or more of the blobs correspond to the MICR code on the check. FIG. 8 is an example result of executing the flowchart of FIG. 4. Other blobs may correspond to payor's name, address, and the payment amount.

Figure 9:
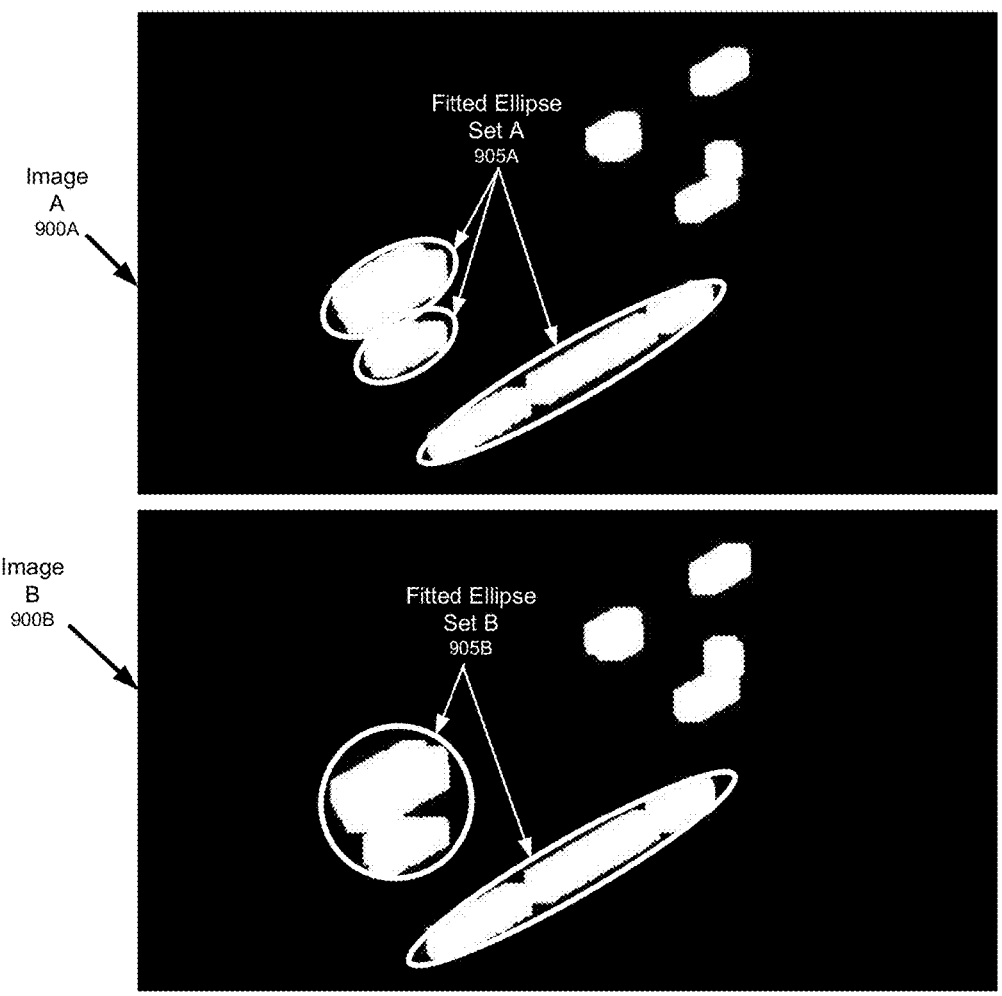

FIG. 9 shows image A (900A) and image B (900B). Image A (900A) and image B (905B) shows the blobs following different amounts of dilation. Ellipse set A (905A) is being fitted to at least some of the dilated blobs in image A (900A). Ellipse set B (905B) is being fitted to at least some of the dilated blobs in image B. Each ellipse in ellipse set A (905A) has a rotation angle. A variance in the rotation angles for ellipse set A (905A) may be calculated. Each ellipse in ellipse set B (905B) also has a rotation angle. A variance in the rotation angles for ellipse set B (905B) is also calculated. The variance for ellipse set A (905A) is determined to be smaller than the variance for ellipse set B (905B). Accordingly, the estimated rotation angle of the check is calculated as the mean of the rotation angles for ellipse set A (905A). The estimate rotation angle of the check is used to generate a custom kernel. FIG. 9 shows example results of executing Steps 303-320 in FIG. 3.

Figure 10:
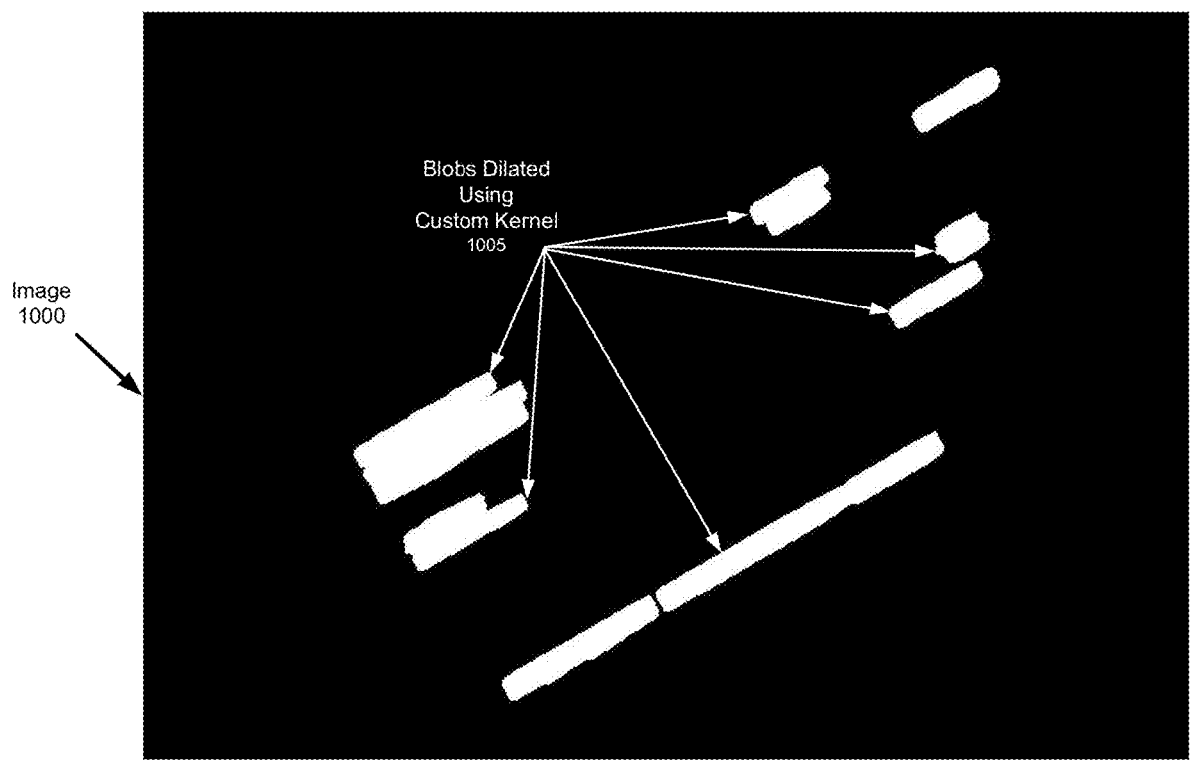

FIG. 10 shows the image (1000) following dilation of the blobs using the custom kernel (i.e., the kernel generated based on the estimated rotation angle). The dilated blobs (1005) are much more rectangular in shape than the dilated blobs in FIG. 9. FIG. 10 is an example of executing Step 335 in FIG. 3.

Figure 11:
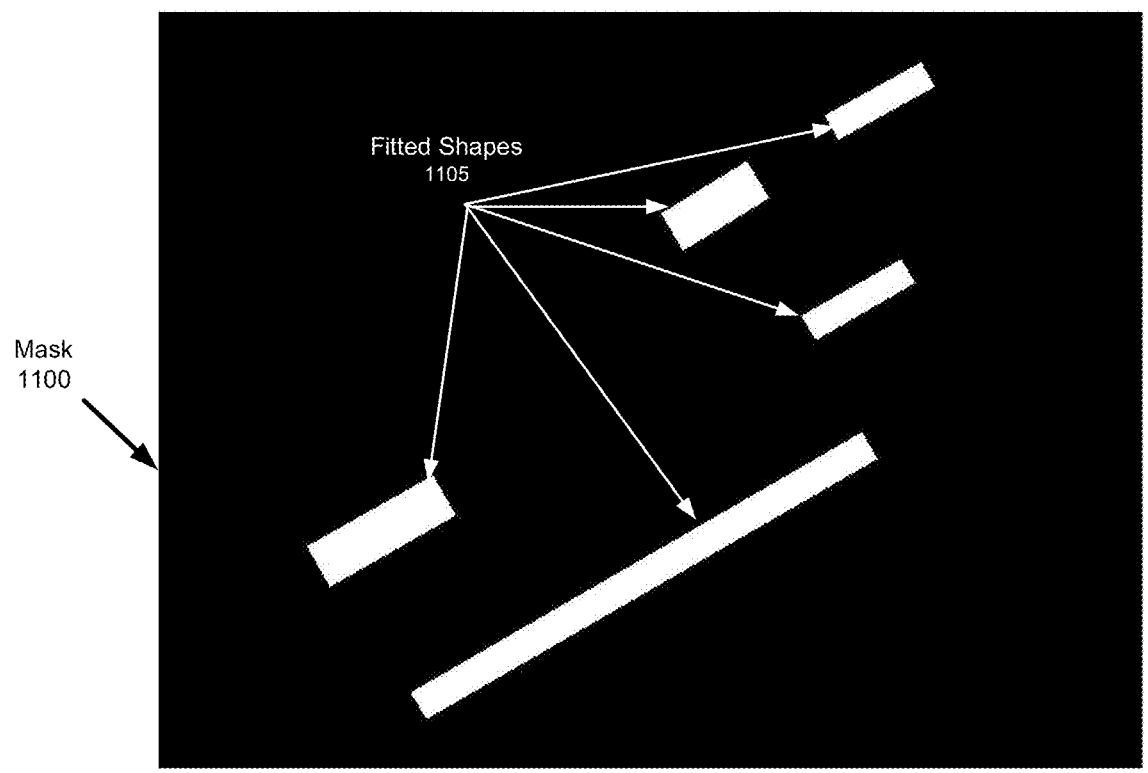

FIG. 11 shows a mask (1100) with multiple shapes (e.g., rectangles) (1105) fitted to the blobs. When the mask (1100) is applied to the image (700), only the stable region of the check, as determined by these fitted shapes (1105), will be exposed. At least one of the fitted shapes (1105) will correspond to the MICR code. However, at this point, it is unknown which one corresponds to the MICR code. FIG. 11 is the result of executing Step 210 in FIG. 2.

Figure 12:
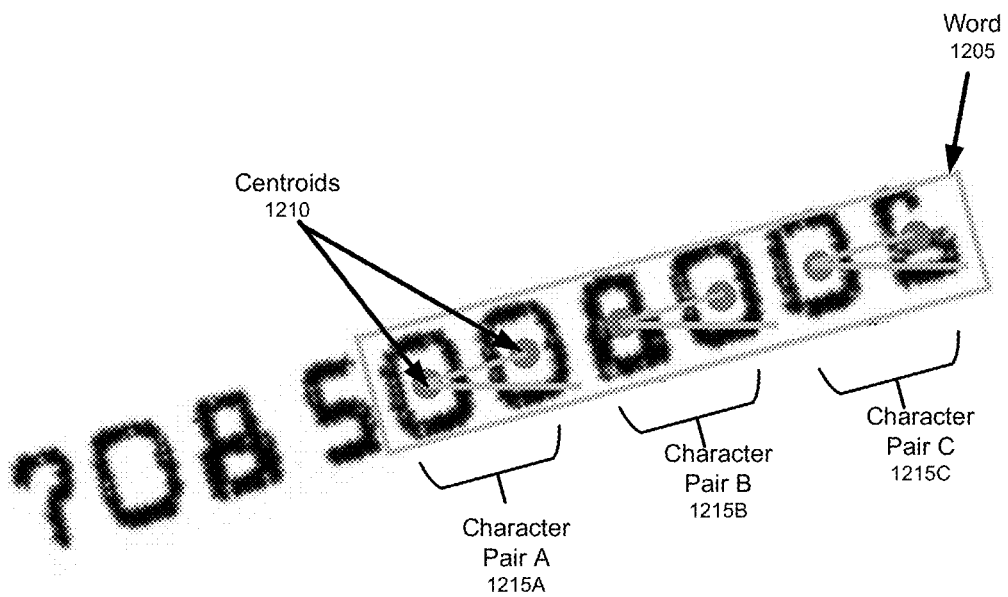

FIG. 12 shows multiple characters pairs: character pair A (1215A), character pair B (1215B), and character pair C (1215C). The centroids (1210) of the characters are used to calculate an angle for each of the character pairs (1215A, 1215B, 1215C). Moreover, because the character pairs (1215A, 1215B, 1215C) are similar angles, they may be grouped to form a word (1205). Moreover, an angular estimate for the word (1205) is calculated based on the angles for the character pairs (1215A, 1215B, 1215C). FIG. 12 is an example of executing Steps 505, 510, 520, and 530 in FIG. 5.

Figure 13:
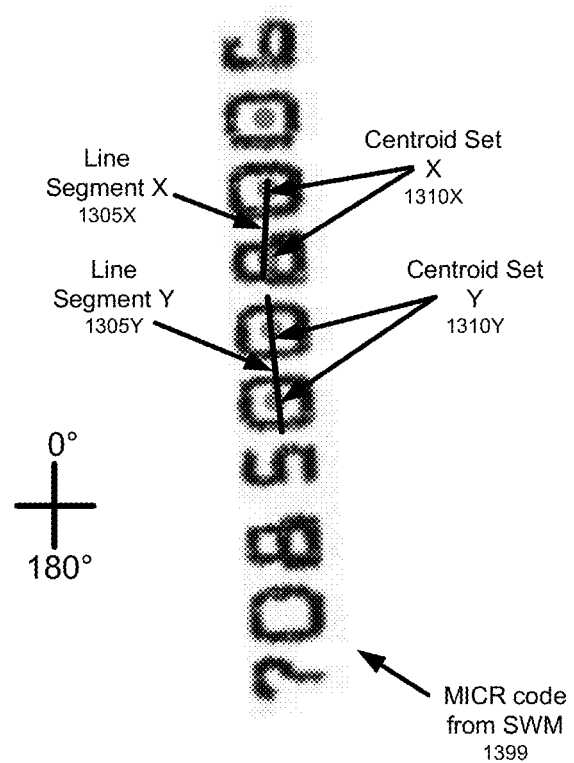

FIG. 13 is an example of Step 515 in FIG. 5. As shown in FIG. 13, the MICR code from the SWM (1399) is almost vertical (i.e., the check was vertical in the image acquired by the camera). Line segment X (1305X) joins centroids set X (1310X). Line segment Y (1305Y) joins centroid set Y (1310Y). The angle between line segment X (1305X) and the vertical is slightly more than 0°. The angle between line segment Y (1305Y) and the vertical is slightly less than 180°. The angle between line segment between line segment Y (1305Y) and the vertical may be adjusted so that it too is just more than 0°.

Figure 14:
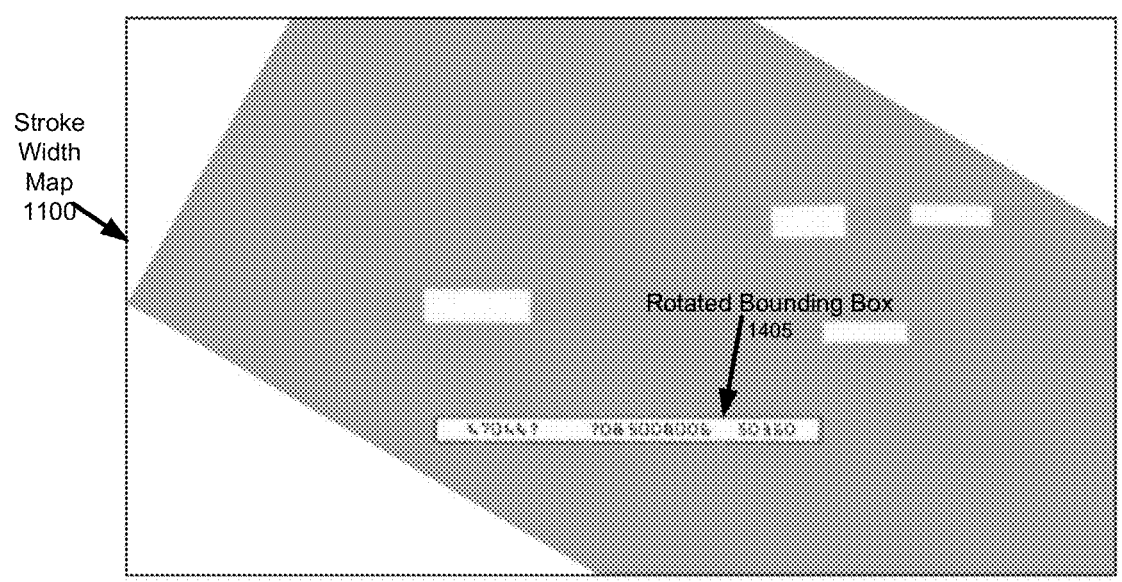

FIG. 14 shows a stroke width map (1100) that has been rotated such that the word line (1150) under consideration is horizontal. Also shown in FIG. 14 is the rotated bounding box (1405). The rotate bounding box (1405) defines the portion of the SWM (1100) that should be cropped and submitted to multiple OCR processes to determine if the word line corresponds to the MICR code. FIG. 14 is an example of executing Step 545 in FIG. 5 and Step 225 in FIG. 2.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 15A:
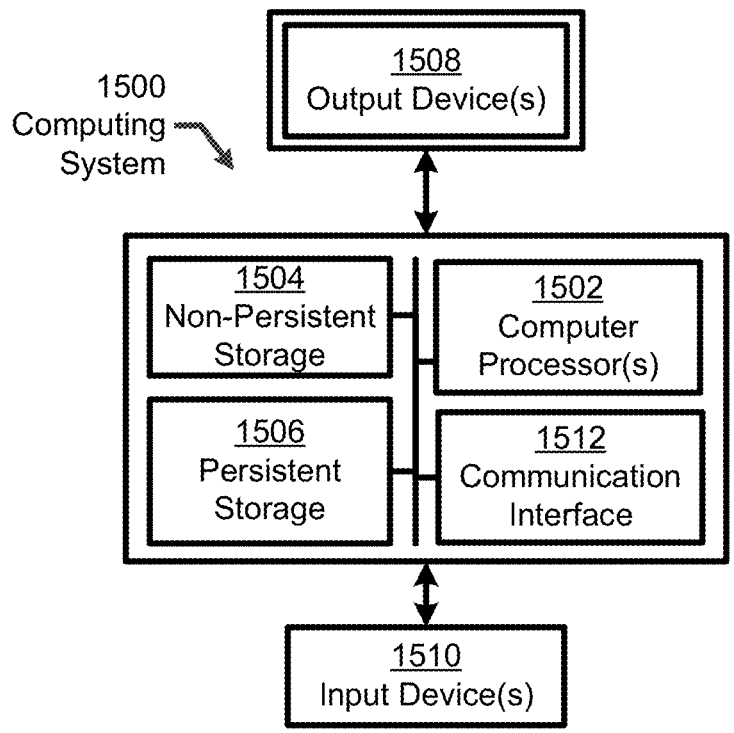
FIG. 15A and FIG. 15B show a computer system in accordance with one or more embodiments of the invention.

Embodiments of the invention may be implemented on a computing system. Any combination of mobile, desktop, server, router, switch, embedded device, or other types of hardware may be used. For example, as shown in FIG. 15A, the computing system (1500) may include one or more computer processors (1502), non-persistent storage (1504) (e.g., volatile memory, such as random access memory (RAM), cache memory), persistent storage (1506) (e.g., a hard disk, an optical drive such as a compact disk (CD) drive or digital versatile disk (DVD) drive, a flash memory, etc.), a communication interface (1512) (e.g., Bluetooth interface, infrared interface, network interface, optical interface, etc.), and numerous other elements and functionalities.

The computer processor(s) (1502) may be an integrated circuit for processing instructions. For example, the computer processor(s) may be one or more cores or micro-cores of a processor. The computing system (1500) may also include one or more input devices (1510), such as a touchscreen, keyboard, mouse, microphone, touchpad, electronic pen, or any other type of input device.

The communication interface (1512) may include an integrated circuit for connecting the computing system (1500) to a network (not shown) (e.g., a local area network (LAN), a wide area network (WAN) such as the Internet, mobile network, or any other type of network) and/or to another device, such as another computing device.

Further, the computing system (1500) may include one or more output devices (1508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1502), non-persistent storage (1504), and persistent storage (1506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 15B:
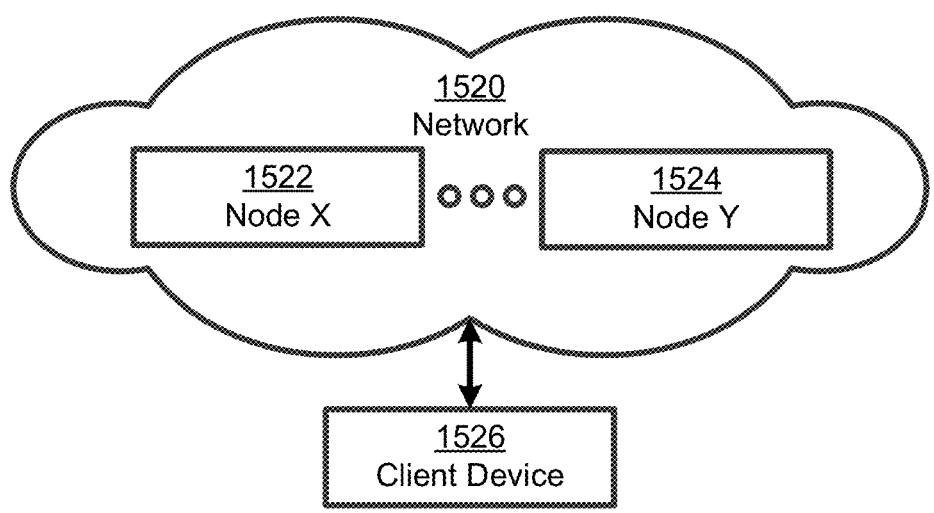

The computing system (1500) in FIG. 15A may be connected to or be a part of a network. For example, as shown in FIG. 15B, the network (1520) may include multiple nodes (e.g., node X (1522), node Y (1524)). Each node may correspond to a computing system, such as the computing system shown in FIG. 15A, or a group of nodes combined may correspond to the computing system shown in FIG. 15A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1500) may be located at a remote location and connected to the other elements over a network.

Although not shown in FIG. 15B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1522), node Y (1524)) in the network (1520) may be configured to provide services for a client device (1526). For example, the nodes may be part of a cloud computing system. The nodes may include functionality to receive requests from the client device (1526) and transmit responses to the client device (1526). The client device (1526) may be a computing system, such as the computing system shown in FIG. 15A. Further, the client device (1526) may include and/or perform all or a portion of one or more embodiments of the invention.

The computing system or group of computing systems described in FIGS. 15A and 15B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 15A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 15A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 15A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 15A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 15A and the nodes and/or client device in FIG. 15B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for image processing, comprising:
   obtaining an image comprising a check with a magnetic ink character recognition (MICR) code;
   generating a mask comprising a plurality of shapes based on the image and an estimated rotation angle of the check;
   generating a stroke width map (SWM) by applying a stroke width transform (SWT) to a plurality of regions in the image corresponding to the plurality of shapes;
   generating a first word line associated with a first region based on a plurality of words in the SWM;
   rotating a portion of the SWM associated with the first word line; and
   detecting, after rotating, the MICR code by applying a plurality of OCR processes to the portion of the SWM.

2. The method of claim 1, wherein generating the mask comprises:
   identifying a plurality of blobs in the image;
   fitting a first plurality of ellipses to the plurality of blobs;
   calculating the estimated rotation angle of the check based on the first plurality of ellipses;
   generating a kernel based on the estimated rotation angle of the check;
   dilating the plurality of blobs based on the kernel;
   fitting a second plurality of ellipses to the plurality of blobs after dilating the plurality of blobs based on the kernel; and
   revising the estimated rotation angle of the check based on the second plurality of ellipses.

3. The method of claim 2, wherein identifying the plurality of blobs comprises:
   identifying a contour within the image;
   determining a vertex count and an aspect ratio for the contour;
   determining the contour corresponds to the check based on the vertex count and the aspect ratio; and
   applying a maximally stable extremal region (MSER) operation to a portion of the image within the contour.

4. The method of claim 2, further comprising:
dilating the plurality of blobs by a first amount before fitting the first plurality of ellipses;
calculating a first variance in rotation angles for the first plurality of ellipses;
dilating the plurality of blobs by a second amount before generating the kernel;
fitting, before generating the kernel, a third plurality of ellipses to the plurality of blobs after dilating the plurality of blobs by the second amount;
calculating a second variance in rotation angles for the third plurality of ellipses; and
determining the first variance is less than the second variance,
wherein the estimated rotation angle of the check is calculated based on the first plurality of ellipses in response to the first variance being less than the second variance.

5. The method of claim 2, further comprising:
increasing, before dilating the plurality of blobs based on the kernel, a shape of the kernel based on the longest major axis among the first plurality of ellipses.

6. The method of claim 2, further comprising:
determining, for a blob of the plurality of blobs, a solidity measure;
generating a first comparison by comparing the solidity measure with a solidity threshold;
generating a second comparison by comparing a dimension associated with the blob with an expected height of the MICR code;
removing the blob from the plurality of blobs based on the first comparison and the second comparison; and
fitting, based on the estimated rotation angle and after removing the blob, the plurality of shapes to the plurality of blobs.

7. The method of claim 1, wherein generating the first word line comprises:
identifying a first angle associated with a first pair of characters in the first region;
identifying a second angle associated with a second pair of characters in the first region; and
forming, in response to the first pair of characters and the second pair of characters being co-linear, a first word by grouping the first pair of characters and the second pair of characters.

8. The method of claim 7, further comprising:
determining an angular estimate for the first word based on the first angle and the second angle; and
determining an angular estimate for a second word in the first word line,
wherein rotating the portion of the SWM is based on the angular estimate for the first word and the angular estimate for the second word.

9. The method of claim 7, further comprising:
determining a representative character width for all characters in the first word line;
identifying a character in the first word line comprising a width less than the representative character width;
removing, in response to the width being less than the representative character width by at least a width tolerance, the character from the first word line; and
determining a bounding box for the first word line after removing the character from the first word line, wherein the bounding box defines the portion of the SWM associated with the first word line.

10. The method of claim 1, further comprising:
generating a second word line for a second region based on a plurality of words in the second region;
determining a variance corresponding to stroke widths of characters in the second word line; and
discarding the second word line based on the variance being less than a stroke width variance threshold.

11. The method of claim 1, further comprising:
extracting a portion of the image associated with the portion of the SWM;
rotating the portion of the image; and
determining at least one selected from a group consisting of a routing number and an account number by executing OCR on the portion of the image and feeding an output of the OCR to a MICR parser.

12. A system for image processing, comprising:
a processor;
a memory;
a buffer that stores an image comprising a check with a magnetic ink character recognition (MICR) code;
a mask engine that is stored in the memory, executes on the processor, and generates a mask comprising a plurality of shapes based on the image and an estimated rotation angle of the check;
a stroke width transform (SWT) engine that is stored in the memory, executes on the processor, and:
generates a stroke width map (SWM) by applying a SWT to a plurality of regions in the image corresponding to the plurality of shapes;
generates a word line associated with a region based on a plurality of words in the SWM; and
rotates a portion of the SWM associated with the word line; and
a voting engine that is stored in the memory, executes on the processor, and detects the MICR code by applying a plurality of OCR processes to the portion of the SWM after the portion is rotated.

13. The system of claim 12, wherein the mask engine also:
identifies a plurality of blobs in the image;
fits a first plurality of ellipses to the plurality of blobs;
calculates the estimated rotation angle of the check based on the first plurality of ellipses;
generates a kernel based on the estimated rotation angle of the check;
dilates the plurality of blobs based on the kernel;
fits a second plurality of ellipses to the plurality of blobs after dilating the plurality of blobs based on the kernel; and
revises the estimated rotation angle of the check based on the second plurality of ellipses.

14. The system of claim 12, wherein the SWT engine generates the word line by:
identifying a first angle associated with a first pair of characters in the first region;
identifying a second angle associated with a second pair of characters in the first region; and
forming, in response to the first plurality of characters and the second plurality of characters being co-linear, a first word of the plurality of words by grouping the first pair of characters and the second pair of characters.

15. The system of claim 14, wherein the SWT engine also:
determines an angular estimate for the first word based on a mean involving the first angle and the second angle; and
determines an angular estimate for a second word of the plurality of words, wherein rotating the portion of the SWM is based on the angular estimate for the first word and the angular estimate for the second word.

16. The system of claim 12, wherein the SWT engine also:
  determines a representative character width for all characters in the word line;
  identifies a character comprising a width less than the representative character width;
  removes, in response to the width being less than the representative character width by at least a width tolerance, the character from the word line; and
  determines a bounding box for the word line after removing the character, wherein the bounding box defines the portion of the SWM associated with the word line.

17. A non-transitory computer readable medium (CRM) storing instructions for image processing, the instructions, when executed by a computer processor, comprise functionality for:
  obtaining an image comprising a check with a magnetic ink character recognition (MICR) code;
  generating a mask comprising a plurality of shapes based on the image and an estimated rotation angle of the check;
  generating a stroke width map (SWM) by applying a SWT to a plurality of regions in the image corresponding to the plurality of shapes;
  generating a word line associated with a region based on a plurality of words in the SWM; and
  rotating a portion of the SWM associated with the word line; and
  detecting the MICR code by applying a plurality of OCR processes to the portion of the SWM after the portion is rotated.

18. The non-transitory CRM of claim 17, wherein the instructions further comprise functionality for:
  identifying a plurality of blobs in the image;
  fitting a first plurality of ellipses to the plurality of blobs;
  calculating the estimated rotation angle of the check based on the first plurality of ellipses;
  generating a kernel based on the estimated rotation angle of the check;
  dilating the plurality of blobs based on the kernel;
  fitting a second plurality of ellipses to the plurality of blobs after dilating the plurality of blobs based on the kernel; and
  revising the estimated rotation angle of the check based on the second plurality of ellipses.

19. The non-transitory CRM of claim 17, wherein the instructions further comprise functionality for:
  identifying a first angle associated with a first pair of characters in the first region;
  identifying a second angle associated with a second pair of characters in the first region; and
  forming, in response to the first pair of characters and the second pair of characters being co-linear, a word of the plurality of words by grouping the first pair of characters and the second pair of characters.

20. The non-transitory CRM of claim 17, wherein the instructions further comprise functionality for:
  determining a representative character width for all characters in the word line;
  identifying a character comprising a width less than the representative character width;
  removing, in response to the width being less than the representative character width by at least a width tolerance, the character from the word line; and
  determining a bounding box for the word line after removing the character, wherein the bounding box defines the portion of the SWM associated with the word line.

* * * * *

UNITED STATES PATENT AND TRADEMARK OFFICE
CERTIFICATE OF CORRECTION

PATENT NO. : 10,896,339 B2
APPLICATION NO. : 16/295740
DATED : January 19, 2021
INVENTOR(S) : Paul Golding It is certified that error appears in the above-identified patent and that said Letters Patent is hereby corrected as shown below:

In the Claims

Claim 14, Column 20, Line 54, the word "first", between the words "the" and "region", should be removed.

Claim 14, Column 20, Line 56, the word "first", between the words "the" and "region", should be removed.

Claim 17, Column 21, at the beginning of Line 25, the words -- stroke width transform -- should be inserted.

Claim 17, Column 21, Line 25, "SWT" should read -- (SWT) --.

Claim 19, Column 22, Line 16, the word "first", between the words "the" and "region", should be removed.

Claim 19, Column 22, Line 18, the word "first", between the words "the" and "region", should be removed.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*